(12) United States Patent
Corpron et al.

(10) Patent No.: US 8,825,228 B2
(45) Date of Patent: Sep. 2, 2014

(54) METHOD AND A DEVICE FOR ASSISTING THE PILOTING OF AN AIRCRAFT, AND AN AIRCRAFT

(75) Inventors: Alban Corpron, Salon de Provence (FR); Stéphane Petit, Mouries (FR)

(73) Assignee: Airbus Helicopters, Marignane Cedex (FR)

( * ) Notice: Subject to any disclaimer, the term of this patent is extended or adjusted under 35 U.S.C. 154(b) by 22 days.

(21) Appl. No.: 13/429,509

(22) Filed: Mar. 26, 2012

(65) Prior Publication Data
US 2012/0253560 A1 Oct. 4, 2012

(30) Foreign Application Priority Data
Mar. 30, 2011 (FR) .................................... 11 00936

(51) Int. Cl.
*B64C 27/00* (2006.01)
*G01C 23/00* (2006.01)
*B64D 43/00* (2006.01)

(52) U.S. Cl.
USPC ........... 701/3; 701/33.9; 244/17.11; 340/946; 340/973

(58) Field of Classification Search
USPC ........................ 701/3, 4, 8, 10, 14, 33.9, 100; 244/17.11, 17.13; 340/946, 967, 973; 416/46
See application file for complete search history.

(56) References Cited

U.S. PATENT DOCUMENTS

| | | | | |
|---|---|---|---|---|
| 3,385,537 A | * | 5/1968 | Lichten et al. ................ | 244/6 |
| 4,514,142 A | * | 4/1985 | Young .............................. | 416/1 |
| 4,736,331 A | * | 4/1988 | Lappos et al. ................. | 701/14 |
| 5,050,081 A | * | 9/1991 | Abbott et al. .................. | 701/14 |
| 5,915,273 A | * | 6/1999 | Germanetti ................ | 73/178 H |
| 5,948,023 A | * | 9/1999 | Evans et al. ..................... | 701/3 |
| 5,986,580 A | * | 11/1999 | Permanne ..................... | 340/946 |
| 6,195,598 B1 | * | 2/2001 | Bosqui et al. ................... | 701/3 |
| 6,332,105 B1 | * | 12/2001 | Calise et al. .................... | 701/3 |
| 6,735,500 B2 | * | 5/2004 | Nicholas et al. ................. | 701/3 |
| 8,121,773 B2 | * | 2/2012 | Gaulmin et al. .............. | 701/100 |
| 8,295,997 B2 | * | 10/2012 | De Bono et al. .............. | 701/14 |
| 2001/0044679 A1 | * | 11/2001 | Permanne ........................ | 701/3 |

(Continued)

FOREIGN PATENT DOCUMENTS

| | | |
|---|---|---|
| EP | 0811183 A1 | 12/1997 |
| EP | 2258615 A1 | 12/2010 |
| FR | 2749545 A1 | 12/1997 |
| FR | 2756256 A1 | 5/1998 |

OTHER PUBLICATIONS

Search Report and Written Opinion; Application No. FR 1100936; dated: Nov. 10, 2011.

*Primary Examiner* — Fadey Jabr
*Assistant Examiner* — Courtney Heinle
(74) *Attorney, Agent, or Firm* — Brooks Kushman P.C.

(57) ABSTRACT

A method of assisting the piloting of an aircraft (1) comprising a first rotor (5) having a plurality of first blades (6) with a first variable collective pitch, and a second rotor (7) having a plurality of second blades (8) with a second variable collective pitch. According to the method, a computer determines a power limit curve (70) and displays said limit curve (70) in a diagram (60) to inform the pilot of the first and second collective pitch margins available before reaching the limits of at least one operating rating of the power plant of the aircraft.

17 Claims, 2 Drawing Sheets

(56) References Cited

U.S. PATENT DOCUMENTS

| | | | |
|---|---|---|---|
| 2005/0278084 A1* | 12/2005 | Certain | 701/3 |
| 2006/0030975 A1* | 2/2006 | Certain | 701/3 |
| 2006/0287778 A1* | 12/2006 | Oltheten et al. | 701/1 |
| 2008/0140268 A1* | 6/2008 | Todini | 701/3 |
| 2008/0275597 A1* | 11/2008 | Gaulmin et al. | 701/3 |
| 2008/0294305 A1* | 11/2008 | Roesch | 701/3 |
| 2008/0319629 A1* | 12/2008 | Iraudo | 701/100 |
| 2010/0312421 A1* | 12/2010 | Eglin | 701/14 |
| 2011/0071708 A1* | 3/2011 | Chaniot et al. | 701/3 |
| 2013/0090788 A1* | 4/2013 | Christensen et al. | 701/4 |

* cited by examiner

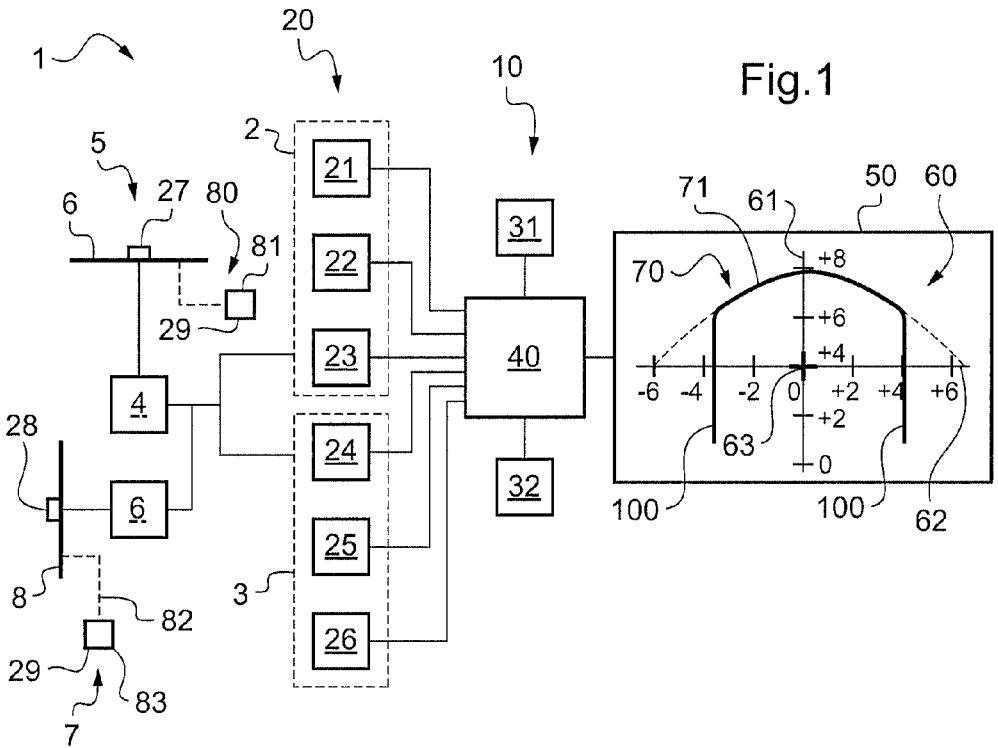
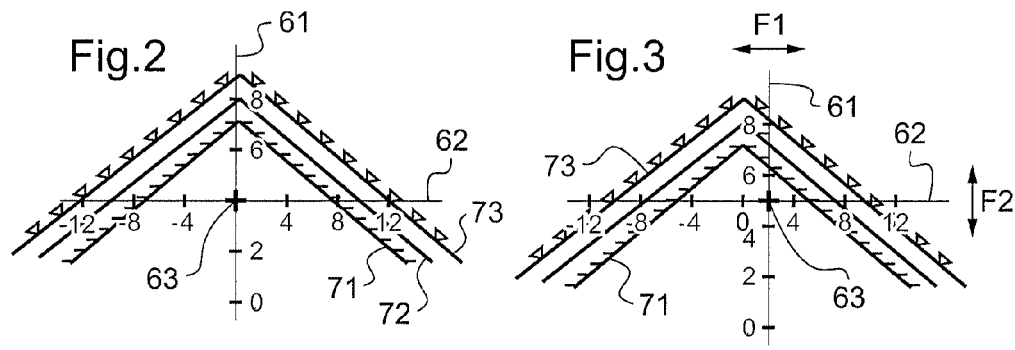
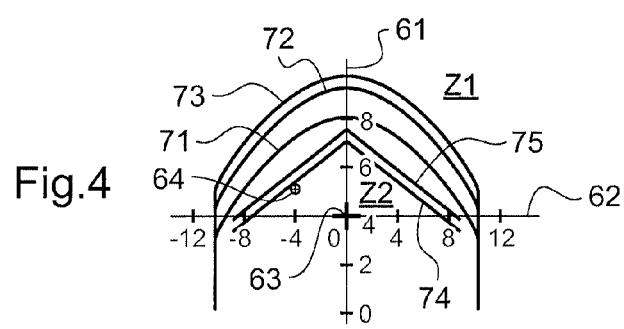

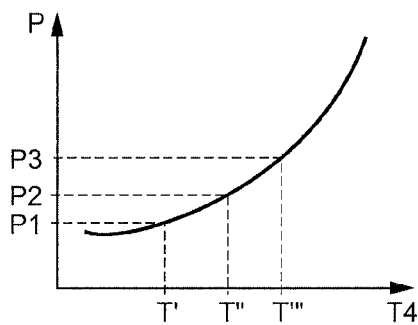
Fig.5
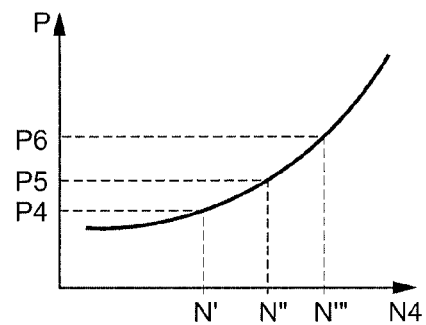
Fig.6
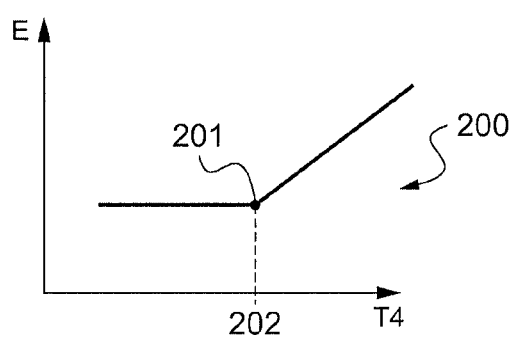
Fig.7
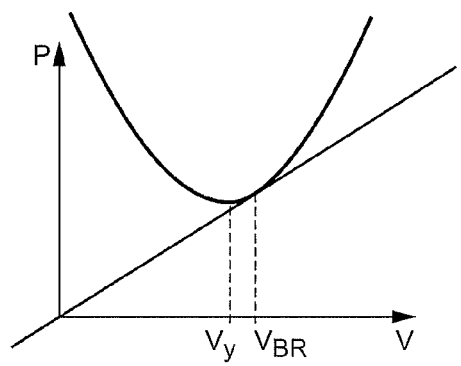
Fig.8
Fig.9
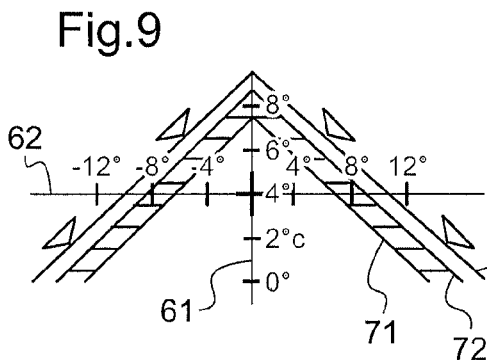
Fig.10
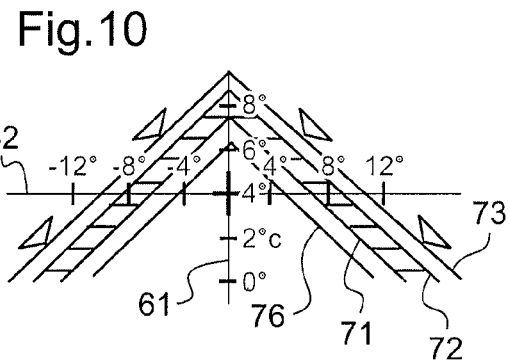

METHOD AND A DEVICE FOR ASSISTING THE PILOTING OF AN AIRCRAFT, AND AN AIRCRAFT

CROSS REFERENCE TO RELATED APPLICATIONS

The present application claims priority to French patent application FR 11/00936 filed on Mar. 30, 2011, the content of which is incorporated herein.

BACKGROUND OF THE INVENTION (1) Field of the Invention

The present invention relates to a method and to a device for assisting the piloting of an aircraft, and also to an aircraft, in particular a rotorcraft provided with a main lift and propulsion rotor together with a tail rotor for providing yaw control.

(2) Description of Related Art

Rotorcraft are generally provided with a power plant comprising at least one engine, such as an engine of the free-turbine turboshaft type. Power is then taken from a low-pressure stage of each free turbine that rotates substantially in the range 20,000 revolutions per minute (rpm) to 50,000 rpm. Consequently, the power plant includes a speed-reducing gearbox for connecting the free turbine to the main propulsion and lift rotor, since the speed of rotation of said rotor lies substantially in the range 200 rpm to 400 rpm: this is referred to as the main gearbox.

Temperature limits of a turbine engine and torque limits of a main gearbox are used to define an operating envelope for the turbine engine covering two normal utilization ratings for a turbine engine on a single-engined or twin-engined rotorcraft:

takeoff rating corresponding to a torque level for the main gearbox and to a temperature level for the engine that are acceptable during a limited period of time without significant degradation, with this takeoff rating being defined by a maximum takeoff power (TOP) and a length of time during which this maximum takeoff power TOP may be used, generally of the order of five minutes;

a maximum continuous rating, this maximum continuous rating being defined by a maximum continuous power (MCP) that corresponds to about 90% of the maximum takeoff powered TOP and by a duration of use for this maximum continuous power MCP that is generally unlimited;

an extended power rating, this extended power rating being defined by an extended power that is substantially equivalent to or even equal to the maximum takeoff power TOP and by a duration for utilizing this extended power that is of the order of thirty minutes; and a transient rating that is determined by regulation of the power plant being defined by a maximum transient power (MTP).

In a twin-engined rotorcraft, the operating envelope also includes supercontingency ratings that are used only when one of the two turbine engines has failed:

the first emergency rating, this emergency rating being defined by a supercontingency power (PSU), sometimes referred to as the "one-engine-inoperative 30-seconds" (OEI 30") rating, which is often equal to about 112% to 120% of the maximum takeoff power, with a maximum duration for which this supercontingency power can be used that is of the order of thirty consecutive seconds, the supercontingency power conventionally being usable three times during a flight;

a second emergency rating, this second emergency rating being defined by a maximum supercontingency power (PMU) sometimes known as the "one-engine-inoperative two minutes" (OEI 2') rating, which is equal to about 105% to 110% of the maximum takeoff power, with this power rating being usable for about two consecutive minutes at most; and a third emergency rating, this third emergency rating being defined by an intermediate supercontingency power (PIU), sometimes referred to as the "one-engine-inoperative continuous" (OEI cont) rating, which is substantially equal to the maximum takeoff power and corresponds to an unlimited duration of utilization of this intermediate supercontingency power for the remainder of the flight after one engine has failed.

By calculation or by testing, the engine manufacturer draws up available power curves for a turbine engine as a function of altitude and of external temperature, with this being done for each of the above-defined ratings.

Furthermore, the engine manufacturer determines limitations for each turbine engine that make it possible to obtain both the powers MCP, TOP, MTP, OEI 30", OEI 2', OEI cont corresponding to each of the above-specified ratings, and also an acceptable lifetime. These limits are generally monitored by means of three monitoring parameters of the engine: the speed of rotation of the turbine engine gas generator, the engine torque, and the temperature of the gas at the inlet of the low-pressure free turbine of the turbine engine, these quantities being respectively labeled Ng, Cm, and T45 by the person skilled in the art. If the turbine engine includes a high-pressure turbine stage, it is also possible to use the temperature of the gas at the inlet of the high-pressure turbine (written TET), with this gas temperature at the inlet to the high-pressure turbine being difficult to measure and consequently being calculated on the basis of the gas temperature at the inlet to the free turbine, i.e. T45.

Thus, for each rating of the operating envelope of the engine, the manufacturer draws up limits for each monitoring parameter, where these limits may vary as a function of external conditions, i.e. external pressure P0 and external temperature T0 as present outside the aircraft.

For example, for a single-engined aircraft, the engine manufacturer may determine:

first temperature limits $T4_{limTOP}$, $T4_{limMCP}$, and $T4_{limMTP}$ corresponding to the gas temperature at the inlet to the low-pressure free turbine of the engine respectively when the engine is developing maximum takeoff power, maximum continuous power, and maximum transient power, with these first limits varying as a function of external conditions;

second limits $Ng_{limTOP}$, $Ng_{limMCP}$, and $Ng_{limMTP}$ corresponding to the speed of rotation of the engine gas generator when the engine is developing respectively maximum takeoff power, maximum continuous power, and maximum transient power, these second limits varying as a function of external conditions; and third limits $TQ_{limTOP}$, $TQ_{limMCP}$, and $TQ_{limMTP}$ corresponding to the torque exerted on the outlet shaft of the engine while the engine is developing respective maximum takeoff power, maximum continuous power, and maximum transient power, these third limits varying as a function of external conditions.

It should be observed that the third limits may be measured by analogy on the basis of the torque exerted by the main gearbox, at the inlet of the main gearbox and/or at its mast for driving the main rotor, for example.

These various limits are established by the engine manufacturer and the aircraft builder, in the form of tables, a database, or equations, for example.

The pilot must therefore control the aircraft while taking into consideration the appropriate limits in order to comply with the recommendations of the engine manufacturer so as to protect the moving assemblies of the helicopter.

In order to control these limits, various piloting assistance devices are known.

Document FR 2 749 545 discloses a piloting indicator that presents information relating to that one of the monitoring parameters of the turbine engine that is the closest to its own limit value. The information relating to the limitations that need to be complied with are thus brought together on a single display, making it possible firstly to provide a summary thereof, presenting only the result of the summary so as to simplify the task of the pilot, and secondly to save space on the instrument panel. This provides a "limiting parameter" from amongst said monitoring parameters of the turbine engine, where the limiting parameter is that one of the parameters that presents a current value that is the closest to the limit value for said parameter. That is why such an indicator is referred to below as a "first limitation indicator", or (FLI).

For example, the various monitoring parameters are converted to a comparable scale in terms of engine torque after being compared with their respective limits, which limits may be variable in order to take account of external pressure and external temperature, or indeed of levels of power being taken off from the engine.

In addition, variants of this FLI serve to display the value of the limiting parameter in terms of collective pitch margin for the blades of the main rotor of the rotorcraft.

For example document FR 2 756 256 suggests presenting on a display screen the available power margin for the engine before it reaches a limit on a scale that is graduated in equivalent collective pitch for the blades of the main rotor, which scale travels past an index that is representative of the actual collective pitch of said blades. For example, the index may be in register with a first graduation, and the limit of the limiting parameter at a given power may be in register with a second graduation that is greater than the first graduation. The pilot then knows the collective pitch margin that is available before reaching said given power.

Document EP 0 811 183 describes an alternative piloting assistance device.

In a helicopter, it should be understood that the power developed by the power plant is indeed consumed by the main lift and propulsion rotor, but is also consumed by other members, e.g. the tail rotor.

Document FR 2 749 545 suggests taking into consideration the power that is being taken off while establishing the values of the limits. Although that can be advantageous, it will be understood that the pilot might be disturbed on observing a change in said limits, even when the pilot is not acting on the control lever for controlling the collective pitch of the blades of the main rotor.

Documents EP 2 258 615 and US 2005/278084 are also known.

BRIEF SUMMARY OF THE INVENTION

The present invention seeks to propose a method and a device for assisting the piloting of an aircraft that has a first rotor and a second rotor driven by a power plant comprising a main gearbox connected to at least the first rotor and to at least one engine.

It should be observed that the term "rotor" is used to designate either a puller or a pusher propeller, or a lift and/or propulsion rotor, or a tail rotor for controlling yaw, for example.

According to the invention, a piloting assisting method is applied to an aircraft comprising a first rotor having a plurality of first blades with a first variable collective pitch, and a second rotor having a plurality of second blades with a second variable collective pitch, the aircraft having a power plant provided with at least one engine operating in a plurality of ratings, the power plant being monitored by a computer via a plurality of predetermined monitoring parameters.

The computer may comprise a processor type calculation unit with a memory containing a program having a plurality of code segments for implementing the various steps of the method. The computer may be an on-board computer.

By way of example, the plurality of ratings comprises at least one rating to be selected from a list including a takeoff rating, a maximum continuous rating, an extended power rating, a transient rating, a first emergency rating, a second emergency rating, and a third emergency rating. The monitoring parameters may include at least one parameter for selecting from a list including the speed of rotation of a gas generator of the engine, the torque of the engine, and the temperature of the gas at the inlet of a free turbine of the engine. It is possible to measure and use the torque exerted on a main gearbox of the power plant that is interposed between the engine and the rotor in order to determine the engine torque.

The method may optionally be applied to a helicopter having a main rotor and a tail rotor, to a helicopter having two contrarotating rotors, to an aircraft having a lift rotor and a propeller, or to an aircraft having two propellers.

In a first step of the method, the computer determines first and second collective pitches at each instant, by measuring the positions of the flight controls, for example. The computer then causes an index to be displayed, said index pointing to the first collective pitch and to the second collective pitch in a diagram, the diagram having a first axis and a second axis that are graduated in collective pitch units relating respectively to the first collective pitch and to the second collective pitch.

Furthermore, during a second step implemented in parallel with the first step, the computer determines a limiting parameter corresponding to that one of the monitoring parameters that is the closest to its limit in the current operating rating of the engine. For example, the computer determines the power that needs to be supplied for a monitoring parameter to reach its limit associated with the operating rating in use by the engine, the limiting parameter being the monitoring parameter that is associated with the smallest determined power. It is also possible to express each monitoring parameter as a percentage relative to its limit, the limiting parameter being the monitoring parameter that has the smallest percentage margin. Reference may be made to the state of the art in order to obtain information about how a limiting parameter may be determined.

Furthermore, the term "current" is used to qualify information that is obtained in real time, it being understood that the term "instantaneous" is sometimes used by the person skilled in the art.

Starting from the limiting parameter, the computer determines at least one available power margin for the engine in real time, each power margin corresponding to the power to be delivered in order to cause the limiting parameter to reach a limit associated with one of said ratings. For example, a power margin is determined that is associated with each of the predetermined operating ratings of the engine.

Under such circumstances, the computer determines one power limit curve per power margin and displays the limit curve in the diagram to inform the pilot about the first and second collective pitch margins that are available before reaching the limit for each rating.

Each limit curve is a function that serves, for example, to give the second collective pitch as a function of first collective pitch so as to display the set of first and second collective pitch pairs that will lead to reaching the associated limit. The computer may include a library containing the limit curves associated with each possible power margin and with each rating. For example, if the computer measures a first power margin before reaching a takeoff rating limit, and a second power margin before reaching a transient rating limit, and a third power margin before reaching a maximum continuous power rating limit, the computer displays first, second, and third curves corresponding respectively to said power margins by referring to its library, for example.

Consequently, in this method, a two-dimensional display is used to show the pilot the first and second collective pitch variations available to the pilot before reaching an engine limit.

For example, a tail rotor of a helicopter may consume as much as 15% of the power delivered by the power plant, so taking this power consumption into account improves the accuracy of the piloting assistance device. Furthermore, the pilot can see clearly the effect of piloting actions on the first and second collective pitch controls.

On a helicopter, the method also avoids modifying limits that might be disturbing for a novice pilot, e.g. resulting from varying the collective pitch of the tail rotor by using the pedals while taking no action on the lever for controlling the collective pitch of the main rotor.

The method may also include one or more of the following additional characteristics.

For example, each of the first and second collective pitches is mechanically bounded between two extremums, and if a limit curve reaches one of the extremums, said limit curve is truncated by means of a straight line orthogonal to one of the axes of the diagram and passing through the extremum that has been reached. The accuracy of the displayed information is thus increased.

In another aspect, the computer may determine and display a damage curve representing the damage of the power plant by determining a power difference between the current power developed by the engine and a predetermined threshold power generating a minimum amount of damage.

Under such circumstances, if the pilot seeks to optimize maintenance operations and the lifetime of the power plant, it is possible to pilot the aircraft in such a manner as to position the index as close as possible to the damage curve.

The damage diverges from a threshold value in a graph presenting a monitoring parameter along the abscissa and damage up the ordinate, the threshold power being equal to the power developed by the engine when the monitoring parameter reaches the threshold value.

In another aspect, the computer may determine and display an optimum fuel consumption curve for the power plant by determining a power gap between the current power being developed by the engine and a predetermined limit power, the predetermined limit power corresponding to the power to be developed in order for the aircraft to reach a predetermined forward speed, also known as the "velocity of best range" (VBR).

Under such circumstances, if the pilot seeks to optimize the overall performance of the aircraft in terms of energy expenditure, it is possible to control the aircraft so as to position the index as close as possible to the optimum consumption curve.

At low speed, the efficiency of the engine from a fuel consumption point of view is relatively low, but the aerodynamic drag on the aircraft is also low. Conversely, at high speed, the efficiency of the engine from a fuel consumption point of view is relatively good, but the aerodynamic drag of the aircraft is high. It should be observed that an optimum compromise is obtained at a predetermined forward speed. The method in this variant thus makes provision for displaying the set of first and second collective pitch pairs that give rise to said predetermined speed.

Furthermore, the index may optionally be displayed at the intersection of the first axis and the second axis. The pilot then identifies the situation very quickly. The index is then either a cross marked at the intersection, or merely the point of intersection of the first axis and the second axis, for example.

In an implementation, the first axis and the second axis are movable relative to each other, the computer moving the first axis along the second axis when the second collective pitch varies, and the computer moving the second axis along the first axis when the first collective pitch varies. The various curves displayed do not move unless there are changes to the limits that might be caused in particular by a change in external conditions or a change in the state of health of one or more engines.

In another implementation, the computer moves the graduations of the first axis when the first collective pitch varies and moves the graduations of the second axis when the second collective pitch varies, said curves moving accordingly.

In a variant, the power plant includes a plurality of engines, and the computer displays information relating to the engine having the limiting parameter that is closest to its limit.

Furthermore, the computer may determine and display a predictive pointer in the diagram of the display means, the pointer serving at the beginning of a maneuver to present the first and second collective pitches that the aircraft ought to reach at the end of the maneuver.

During a transient period, the information that is displayed might not correspond to the current situation, e.g. because of the delay that is observed between the moment when a pilot applies the required collective pitch and the moment when an opposing torque appears on the rotor, or because of progressive acceleration of the engine in order to go from a first stage corresponding to delivering low torque to a second stage corresponding to delivering a large amount of torque.

For example, the piloting assistance device may present a limit curve that has a point separated from the index by a first collective pitch of four degrees and by a second collective pitch of zero. If the pilot moves a control by mistake so as to require a first collective pitch of six degrees, the first collective pitch will increase progressively. The pilot is then unaware that a limit is about to be exceeded. In contrast, by displaying the pointer from the very beginning of the maneuver, the pilot is informed that the engine is going to operate beyond said limit, thus enabling the pilot to correct the given order.

Similarly, the computer may determine a predictive limiting parameter by applying the teaching of document FR 2 871 520, for example, and it may display a predictive curve in the diagram of the display means, said predictive curve serving at the beginning of a maneuver to present all of the first and second collective pitch pairs that generate said predictive parameter.

Thus, the processor means may calculate the predictive limiting parameter on the basis of a predictive relationship in which IPT, FLI, k, and dFLI/dt correspond respectively to the estimated value of the predictive limiting parameter, to the current value of the limiting parameter, a multiplying coefficient, and variation of the current parameter during a time interval:

$$IPT = FLI + \left(k\frac{dFLI}{dt}\right)^4$$

In another technique, the manufacturer establishes performance models for the rotors and the engines by testing. On the basis of an order given by the pilot, the processor means determines the final power that will be consumed by the rotors, and then deduces therefrom a predictive curve that, at the beginning of the maneuver, presents all of the first and second collective pitch pairs that generate said final power.

In addition to a method, the invention also provides a device for providing assistance in piloting by implementing the method.

According to the invention, the device for assisting in piloting an aircraft includes sensors for measuring a plurality of predetermined monitoring parameters of the power plant, the aircraft comprising a first rotor having a plurality of first blades with a first variable collective pitch, and a second rotor having a plurality of second blades with a second variable collective pitch, said aircraft having a power plant provided with at least one engine operating in a plurality of ratings.

This device is remarkable in particular in that it comprises first measurement means for measuring the first collective pitch and second measurement means for measuring the second collective pitch together with display means connected to the computer, the device including an index controlled by the computer and pointing on the display means to said first collective pitch and to said second collective pitch in a diagram having a first axis and a second axis that are graduated in collective pitch units relating respectively to the first collective pitch and to the second collective pitch, the computer using the measurement sensors to determine at least one available power margin of the engine corresponding to the power to be supplied in order to cause a limiting parameter to reach a limit associated with one of said ratings so as to display one available power limit curve per power margin in said diagram, thereby informing the pilot of the first collective pitch margin and of the second collective pitch margin that are available before reaching the limit of at least one rating.

In addition, the first and second measurement means may measure the first and second current collective pitches in real time, and the device may include measurement members for measuring a first order relating to the first collective pitch and a second order relating to the second collective pitch in order to a display pointer.

The invention also provides an aircraft comprising a first rotor having a plurality of first blades with a first variable collective pitch, and a second rotor having a plurality of second blades with a second variable collective pitch, the aircraft having a power plant provided with at least one engine operating in a plurality of ratings, the aircraft having a first control system including a first control connected to said first blades and a second control system including a second control connected to said second blades.

This aircraft is remarkable in particular in that it includes a piloting assistance device as described above.

It should be observed that first measurement means for measuring the first collective pitch may be arranged in the first control system with second measurement means for measuring the second collective pitch optionally being arranged in the second control system.

BRIEF DESCRIPTION OF THE SEVERAL VIEWS OF THE DRAWINGS

The invention and its advantages appear in greater detail from the context of the following description of embodiments given by way of illustration with reference to the accompanying figures, in which:

FIG. 1 is a block diagram of an aircraft and a piloting assistance device of the invention;

FIGS. 2 to 4 are views of the display means for explaining the method that is implemented;

FIGS. 5 and 6 are graphs explaining how a limiting parameter is calculated;

FIG. 7 is a graph explaining how a threshold value is determined;

FIG. 8 is a graph showing the predetermined forward speed; and

FIGS. 9 and 10 are figures for explaining in particular a variant that is provided with movable graduations.

DETAILED DESCRIPTION OF THE INVENTION

Elements that are present in more than one of the figures are given the same references in each of them.

FIG. 1 represents an aircraft 1 provided with a first rotor 5 having a plurality of first blades 6 with a first variable collective pitch, and a second rotor 7 having a plurality of second blades 8 with a second variable collective pitch.

By way of example, the aircraft 1 is a helicopter, the first rotor represents the main lift and propulsion rotor of the helicopter, and the second rotor represents the tail rotor of the helicopter.

The aircraft 1 also possesses a first control system 80 including a first control 81 of the lever type for controlling collective pitch, e.g. to enable a pilot to control the first collective pitch, and a second control system 82 including a second control 83 of the pedal type, e.g. to enable a pilot to control the second collective pitch.

In order to set the first and second rotors 5 and 7 into rotation, the aircraft includes a power plant having at least one engine, e.g. of the type comprising a turboshaft engine with at least one gearbox. For example, this power plant comprises a first engine 2 and a second engine 3 driving the first rotor 5 via a main gearbox 4 and the second rotor 7 via a tail gearbox 6. Naturally, other architectures are clearly possible.

The engines operate within an operating envelope that includes a plurality of ratings, e.g. selected from a list including a TOP rating, an MCP rating, an MTP rating, a first emergency rating PSU, a second emergency rating PMU, and a third emergency rating PIU.

The aircraft 1 also includes a piloting assistance device 10 that comprises a computer 40.

The computer 40 is connected by wire or wireless connections to sensors 20 for measuring parameters for monitoring the engines 2 and 3. The monitoring parameters include at least one parameter to be selected from a list that includes the speed of rotation Ng of a gas generator of each engine, the torque TQ of each engine, and a gas temperature, in particular the gas temperature T45 at the inlet to a low-pressure free turbine of each engine.

Under such circumstances, the piloting assistance device 10 possesses a measurement sensor 21, 24 for measuring the speed of rotation Ng of each engine, a measurement sensor 22, 25 for measuring the torque TQ developed by each engine, and a measurement sensor 23, 26 for measuring the gas temperature T45 of each engine. It should be observed that it is possible to measure the torque exerted on a gearbox in order to determine the torque exerted by the set of engines 2 and 3.

Furthermore, the piloting assistance device 10 includes a sensor 31 for sensing outside pressure P0 and a sensor 32 for sensing outside temperature T0, which sensors are connected to the computer 40.

Finally, the computer 40 is connected to display means 50.

Under such circumstances, the piloting assistance device 10 implements first measurement means 27 for measuring the first collective pitch and arranged on the first control system 80, and second measurement means 28 for measuring the second collective pitch, e.g. in the form of sensors present on the rods for controlling the pitch of the blades or on the flight controls. These measurement means communicate with the computer 40 via wired or wireless connections not shown in FIG. 1 in order to avoid pointlessly overloading the figure.

In the method of the invention as implemented by the device 10, the computer 40 determines the first collective pitch and the second collective pitch by using information delivered by the measurement means. Consequently, the piloting assistance device 10 includes an index 63 for presenting this first collective pitch and this second collective pitch on the display means.

The device 10 has a diagram with a first axis 61 graduated in pitch for the first collective pitch and a second axis 62 graduated in pitch for the second collective pitch. By way of example, the index 63 corresponds to the intersection of the first and second axes. In the example of FIG. 1, the first collective pitch has a value of 4 degrees while the second collective pitch has a value of 0 degrees.

It should be observed that the minimum graduation of the first axis may correspond to full fine pitch, with the maximum graduation corresponding to full coarse pitch, where the terms "full coarse pitch" and "full fine pitch" are commonly used by the person skilled in the art.

Furthermore, the computer 40 determines the limit parameter of the power plant, i.e. the monitoring parameter that is closest to its associated limit at the current operating rating of the engines 2 and 3. Furthermore, the computer 40 determines the power margin available between the current power developed by the engines 2, 3 and the power that can be developed by the engines 2, 3 for each operating rating of the engines 2, 3.

It is possible to implement the teaching of the state of the art using sensors for sensing external pressure and external temperature, while also using the measurement sensors 20.

For example, with reference to FIG. 5, the engine manufacturer establishes charts supplying the power delivered by an engine as a function of its gas temperature, with limit temperatures appearing on such charts.

Thus, when the turbine engine possesses a current temperature T' under given external conditions, the engine develops a first power P1. Compared with a rating having a second limit temperature T" corresponding to a power P2, and a rating having a third temperature T''' corresponding to a power P3, the engine has available respectively a first power margin equal to the first difference between the second power P2 and the first power P1, and a second power margin equal to the second difference between the third power P3 and the first power P1.

With reference to FIG. 6, the same method may be applied to the speed of rotation Ng of the gas generator of the engine.

For engine torque, it is possible to obtain the corresponding current power by multiplying the torque measured on a rotary member by the speed of rotation of said rotary member, and then by comparing this current power with the powers developed by the engine under various ratings.

The limiting parameter may then be that one of the monitoring parameters that gives rise to the smallest margin with the current rating.

In another algorithm, the percentage margin is determined for each monitoring parameter relative to its limit under the current rating. For example, if the measured temperature is 400° C. (Celsius degrees) and said limit is 500° C., then the computer 40 deduces a temperature margin of 20%.

The limiting parameter is then the monitoring parameter having the smallest percentage margin. Under such circumstances, the computer makes use of charts that have been predetermined by the engine manufacturer and giving a power margin as a function of the percentage margin of a parameter.

Reference may be made to the literature to obtain more information.

With reference to FIG. 1, the computer 40 then determines one limit curve 70 for each previously determined power margin. Each limit curve 70 of the device 10 represents first and second collective pitch pairs that will lead to operating at the limits of the associated operating rating. It can thus be understood that when the index 63 is placed on a limit curve, the engine is developing the maximum power of the associated rating.

By way of example, the limit curve is obtained using a library stored in the computer that provides equations for limit curves as a function of power margins.

Furthermore, the first and second collective pitches may be mechanically bounded between two extremums. Under such circumstances, the computer may truncate each limit curve 70 if the limit curve reaches said extremums.

In the example of FIG. 1, the second collective pitch is bounded between two extremums having values of −4° and +4°. The computer 40 then truncates the limit curve 71 using two straight lines 100 extending orthogonally to the second axis 62 and passing through said extremums.

In another aspect, when the power plant has a plurality of engines, the device 10 presents information about the most limiting engine, i.e. the engine that presents the limiting parameter that is the closest to its limit.

FIG. 1 also shows a single limit curve 71.

Nevertheless, with reference to FIG. 2, the device 10 may have a plurality of limit curves 70, possibly one limit curve per operating rating. For example, the limit curve 70 includes a limit curve 71 representing the maximum continuous power rating, a limit curve 72 representing the takeoff power rating, and a limit curve 73 representing the transient rating.

If a plurality of limit curves are displayed, each curve may be represented in a manner that is different from the other curves so as to make it easy for the pilot to identify the various curves.

On variation of the first and/or second collective pitch, the first and second axes 61 and 62 may present relative movements.

With reference to FIG. 3, the computer 40 may shift the first axis 61 along the second axis 62 as represented by arrow F1 when the second collective pitch varies, and the computer 40 may shift the second axis 62 along the first axis 61 as represented by arrow F2 when the first collective pitch varies.

It can be seen that the limit curves 70 do not move relative to FIG. 2.

In another variant, as shown in FIGS. 9 and 10, the computer 40 moves the graduations of the first axis 61 when the first collective pitch varies and moves the graduations of the second axis 62 when the second collective pitch varies, the various display curves 70 moving accordingly.

The computer may also determine a predictive limiting parameter by applying the teaching of document FR 2 871 520, for example. The device then includes a predictive curve 76 in the diagram of the display means, this predictive curve presenting, at the beginning of a maneuver, all of the first and second collective pitch pairs that will give rise to said predictive parameter.

With reference to FIG. 4, the limit curves 70 are not necessarily linear.

Furthermore, FIG. 4 also shows a damage curve 74 of the piloting assistance device 10.

In this variant, it is possible to inform the pilot of the first and second collective pitch pairs lying between a first zone Z1 corresponding to operation that is very damaging for the engine and a second zone Z2 corresponding to operation that gives rise to little damage.

Thereafter, the computer determines the power difference between the current power and a predetermined threshold power.

With reference to FIG. 7, the engine manufacturer determines various graphs 200 by calculation or by testing, which graphs give said damage as a function of a monitoring parameter, e.g. the gas temperature T45.

It can be seen that this damage is relatively stable up to a point of inflection 201 that corresponds to a threshold value 202 of the monitoring parameter, beyond which damage diverges. The threshold power is then equal to the power developed by the engine when said temperature reaches the threshold value.

Furthermore, with reference to FIG. 1, the device 10 may also include an optimum consumption curve 75 that is determined by the computer 40 and displayed on the diagram 60.

Thus, the computer 40 determines a power gap between the current power being developed by the engine and a predetermined limit power.

With reference to FIG. 8, the predetermined limit power corresponds to the power that needs to be developed in order for the aircraft 1 to reach a predetermined forward speed VBR.

It is recalled that in a graph presenting a curve relating to the power P developed by the engines as a function of the forward speed V, the predetermined forward speed VBR is obtained approximately at the point where said curve is tangential to a straight line passing through the origin of the graph. It should be observed that this predetermined forward speed VBR is different from the speed Vy at minimum power.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A method of assisting the piloting of an aircraft comprising a first rotor having a plurality of first blades with a first variable collective pitch, and a second rotor having a plurality of second blades with a second variable collective pitch, said aircraft having a power plant provided with at least one engine operating in a plurality of ratings, said power plant being monitored by a computer via a plurality of predetermined monitoring parameters, wherein said computer:

determines the current first and second collective pitches at each instant, and causes an index to be displayed, said index pointing to said first collective pitch and to said second collective pitch in a diagram, said diagram having a first axis and a second axis that are graduated in collective pitch units relating respectively to the first collective pitch and to the second collective pitch;

determines a limiting parameter corresponding to that one of the monitoring parameters that is the closest to its limit in the current operating rating of said engine;

determines at least one available power margin for said engine, each power margin corresponding to the power to be delivered in order to cause the limiting parameter to reach a limit associated with one of said ratings; and determines one power limit curve per power margin and displays said limit curve in said diagram to inform the pilot about the first and second collective pitch margins that are available before reaching the limit for each rating.

2. A method according to claim 1, wherein each of the first and second collective pitches is mechanically bounded between two extremums, and if a limit curve reaches one of said extremums, said limit curve is truncated by means of a straight line orthogonal to one of said axes of the diagram and passing through said extremum that has been reached.

3. A method according to claim 1, wherein said computer determines and displays a damage curve representing the damage of the power plant by determining a power difference between the current power developed by the engine and a predetermined threshold power generating a minimum amount of damage.

4. A method according to claim 3, wherein said damage diverges from a threshold value in a graph presenting a monitoring parameter along the abscissa and damage up the ordinate, said threshold power being equal to the power developed by the engine when said monitoring parameter reaches said threshold value.

5. A method according to claim 1, wherein said computer determines and displays an optimum fuel consumption curve for the power plant by determining a power gap between the current power being developed by said engine and a predetermined limit power, said predetermined limit power corresponding to the power to be developed in order for said aircraft to reach a predetermined forward speed (VBR).

6. A method according to claim 1, wherein said index is displayed at the intersection between the first axis and the second axis.

7. A method according to claim 1, wherein said first axis and said second axis are movable relative to each other, said computer moving the first axis along the second axis when the second collective pitch varies, and said computer moving the second axis along the first axis when the first collective pitch varies.

8. A method according to claim 1, wherein said computer moves the graduations of the first axis when the first collective pitch varies and moves the graduations of the second axis when the second collective pitch varies, said curves moving accordingly.

9. A method according to claim 1, wherein said plurality of ratings comprises at least one rating to be selected from a list including a takeoff rating, a maximum continuous rating, a transient rating, a first emergency rating, a second emergency rating, and a third emergency rating, said monitoring parameters including at least one parameter for selecting from a list including the speed of rotation of a gas generator of the engine, the torque of the engine, and the temperature of the gas at the inlet to a free turbine of the engine.

10. A method according to claim 1, wherein said power plant includes a plurality of engines, and said computer displays information relating to the engine having the limiting parameter that is closest to its limit.

11. A method according to claim 1, wherein said computer determines and displays a predictive pointer in said diagram, said pointer serving at the beginning of a maneuver to present the first and second collective pitches that the aircraft ought to reach at the end of said maneuver.

12. A method according to claim 1, wherein said computer determines a predictive limiting parameter at the beginning of a maneuver and displays a predictive curve in the diagram of the display means, said predictive curve serving at the beginning of a maneuver to present all of the first and second collective pitch pairs that generate said predictive parameter.

13. A device for assisting the piloting of an aircraft comprising a first rotor having a plurality of first blades with a first variable collective pitch, and a second rotor having a plurality of second blades with a second variable collective pitch, said aircraft having a power plant provided with at least one engine operating in a plurality of ratings, said device including measurement sensors for measuring a plurality of predetermined monitoring parameters of the power plant, wherein the device comprises first measurement means for measuring the first collective pitch and second measurement means for measuring the second collective pitch together with display means connected to a computer, said device including an index controlled by said computer and pointing on the display means to said first collective pitch and to said second collective pitch in a diagram having a first axis and a second axis that are graduated in collective pitch units relating respectively to the first collective pitch and to the second collective pitch, said computer using said measurement sensors to determine at least one available power margin of the engine corresponding to the power to be supplied in order to cause a limiting parameter to reach a limit associated with one of said ratings so as to display one available power limit curve per power margin in said diagram, thereby informing the pilot of the first collective pitch margin and of the second collective pitch margin that are available before reaching the limit of at least one rating.

14. A device according to claim 13, wherein said first and second measurement means measure the first and second current collective pitches in real time, and said device includes measurement members for measuring a first order relating to the first collective pitch and a second order relating to the second collective pitch.

15. An aircraft comprising a first rotor having a plurality of first blades with a first variable collective pitch, and a second rotor having a plurality of second blades with a second variable collective pitch, said aircraft having a power plant provided with at least one engine operating in a plurality of ratings, said aircraft having a first control system including a first control connected to said first blades and a second control system including a second control connected to said second blades, wherein the aircraft includes a piloting assistance device according to claim 13.

16. An aircraft according to claim 15, wherein first measurement means for measuring the first collective pitch are arranged in the first control system with second measurement means for measuring the second collective pitch being arranged in the second control system.

17. A method of assisting the piloting of an aircraft, the aircraft comprising a first rotor having a first plurality of blades with a first variable collective pitch, a second rotor having a second plurality of blades with a second variable collective pitch, a power plant having a plurality of engines, and a computer monitoring a plurality of power plant parameters, wherein the computer performs the following steps:

monitoring a plurality of power plant parameters;

determining an instantaneous first collective pitch of the first rotor and an instantaneous second collective pitch of the second rotor;

determining a limiting parameter corresponding to one of the plurality of power plant parameters that is closest to an instantaneous operating limit;

determining an available power margin corresponding to an engine power required to cause the limiting parameter to reach the operating limit;

determining a power limit curve associated with the available power margin;

displaying the power limit curve associated with the engine having the limiting parameter that is closest to its operating limit and an index indicating the first collective pitch and the second collective pitch on a diagram on a computer monitor to indicate first and second collective pitch margins, the diagram having first and second axes that are graduated in collective pitch units relating respectively to the first collective pitch and to the second collective pitch, the index being displayed at an intersection of the first and second axes; and displaying a predictive pointer in the diagram, the pointer serving at the beginning of the maneuver to present the first and second collective pitches that the aircraft ought to reach at the end of said maneuver.

* * * * *